United States Patent
Khulief et al.

(10) Patent No.: US 9,188,471 B2
(45) Date of Patent: Nov. 17, 2015

(54) TWO-PHASE FLOW SENSOR USING CROSS-FLOW-INDUCED VIBRATIONS

(71) Applicants: King Fahd University of Petroleum and Minerals, Dhahran (SA); King Abdulaziz City for Science and Technology, Riyadh (SA)

(72) Inventors: Yehia Abel Khulief, Dhahran (SA); Wael Hasan Ahmed, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 93 days.

(21) Appl. No.: 14/258,148

(22) Filed: Apr. 22, 2014

(65) Prior Publication Data

US 2015/0300859 A1    Oct. 22, 2015

(51) Int. Cl.
*G01F 1/74*    (2006.01)

(52) U.S. Cl.
CPC ........................................ *G01F 1/74* (2013.01)

(58) Field of Classification Search
CPC .............. G01F 1/74; G01F 1/56; G01F 15/00
USPC ............................. 73/861.04, 861.08, 861.77
See application file for complete search history.

(56) References Cited

U.S. PATENT DOCUMENTS

| | | | | |
|---|---|---|---|---|
| 3,408,866 A | * | 11/1968 | Gibson et al. | 73/861.04 |
| 5,804,740 A | * | 9/1998 | Kalinoski et al. | 73/861.24 |
| 6,651,511 B1 | * | 11/2003 | Young | 73/861.08 |
| 2013/0068035 A1 | | 3/2013 | Frisby et al. | |

FOREIGN PATENT DOCUMENTS

| | | |
|---|---|---|
| CN | 201196080 Y | 2/2009 |
| FR | 2744526 A1 | 8/1997 |
| JP | 58122430 A | 7/1983 |
| JP | 62056825 A | 3/1987 |

OTHER PUBLICATIONS

E A Boltenko, et al., Translation of Soviet Union patent No. 1549307 A1. Publication Date May 27, 1997. (6 pages).
P.J. Southworth, et al., "Cross-Flow-Induced Vibrations of Finite Tube Banks in In-Line Arrangements", Journal of Mechanical Engineering Science, vol. 17, No. 4, Aug. 1975, (1 page).

* cited by examiner

*Primary Examiner* — Jewel V Thompson
(74) *Attorney, Agent, or Firm* — Oblon, McClelland, Maier & Neustadt, L.L.P.

(57) ABSTRACT

A sensor system detects the occurrence of two-phase flow by comparing records of fluidelastic force coefficients, which are characteristically different for single-phase and two-phase flows. A baseline of measurements is obtained for a single phase flow, and a baseline of measurements is obtained for a two-phase flow. Measurements of the amplitude and phase of the fluidelastic forces are recorded, and the corresponding fluidelastic force coefficients computed. The fluidelastic force coefficients can be determined for any flow, and compared to the baselines to determine whether the flow is a single-phase or two-phase flow.

6 Claims, 3 Drawing Sheets

TWO-PHASE FLOW SENSOR USING CROSS-FLOW-INDUCED VIBRATIONS

BACKGROUND

1. Field of the Disclosure

The present disclosure relates to flow regimes in pipes. In particular, the present disclosure relates to sensor systems for detecting flow regimes in pipes.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In power generation industries, such as the oil industry, flows in pipes and containers are carefully monitored, often with continuous online measurements of the flow patterns in pipe systems such as oil and gas pipelines, flow in boiler and reactor pipes; etc. In particular, local changes from single-phase flow to two-phase flow and flow pattern changes within two-phase flow are frequently monitored in areas such as pipe bends or in vertical segments of the pipe system where gravitational effects can modify the flow regime. A liquid in a two-phase flow is a mixture of two phases of a component, with different densities, at a certain ratio. This respective distribution or a ratio of a liquid to a vapor phase for example, is an important characteristic of two-phase flow. Similarly to the transition between laminar and turbulent flows in pipes, the transition between single-phase and two-phase flow, and flow regime changes can affect the performance of a pipe system. Accordingly, predicting the onset of two-phase flow or changes in the two-phase flow, i.e. changes in the ratio between the two fluids, are used to maximize system performance. Heat transfer models used in the industry to predict in-tube boiling and condensation are based on local flow patterns. Two-phase flow may develop during part of a steam cycle, wherein a mixture of gas and liquid may exist due to evaporation and condensation of steam. The ability to predict the occurrence of two-phase flow and to accurately determine its pattern is key to modeling phenomena such as evaporation and condensation. Accordingly, it is important to be able to accurately determine and model a transition from single-phase flow to a two-phase flow pattern, as well as transitions from one type of two-phase flow pattern to another.

Assessing whether a flow in a pipe system is a single phase flow or a two-phase flow is challenging. Depending on the nature of the flow, a different model may need to be used as an input, to provide an accurate heat transfer model for example. Furthermore, two-phase flow includes a variety of flow regimes, which require changes to a modeling scheme to obtain better accuracy in reproducing flow patterns.

Current techniques for measuring the two-phase flow include using Venturi pressure drop, Coriolis, electromagnetic, and cross-correlation flow meters, gamma-densitometry tomography, and electrical-impedance tomography. Empirical calibration is the prime methodology adopted by such techniques, while the detailed fluidelastic analysis has played a minimal role in instrument design and operation. Literature related to two-phase flow measurements also describes the use of time-of-flight pressure measurements, ultrasound wave trains, a flowmeter in a closed conduit, echoes of acoustic energy, speed of sound measurements and a Helmholtz resonator.

A phenomenon of cross-flow-induced vibrations is common to both the single-phase and two-phase flows. A cross-flow over a body induces fluidelastic coupling forces that cause a tube immersed in the flow to vibrate due to several fluid-structure interaction mechanisms; e.g. vortex shedding, fluidelastic whirling, turbulent buffeting, etc. For example, a cross-flow over a cylindrical body generates a Karman vortex sheet in the wake region of the body. Periodic shedding of these vortices from the surface of the body induces periodic pressure variations on the body which in turn give rise to flow-induced vibrations. Such vibrations frequently exist in direction both transverse and parallel to the cross-flow direction.

The characteristics of the cross-flow-induced vibrations are quite different for single-phase and two-phase flows due to different fluid-structure interactions. In two-phase flow, the presence of air bubbles give rise to random excitations of the cylinder; thus resulting in larger vibration amplitudes than in single-phase flows. Accordingly, the main difference between single-phase and two-phase flows is the variable buffeting force in the two-phase intermittent flow regime.

SUMMARY

An exemplary embodiment of the proposed sensor system detects the occurrence of two-phase flow by measuring the fluidelastic forces that give rise to flow-induced vibrations of a cylinder subjected to cross-flow, and by comparing the fluidelastic force measurements to records of measurements of the fluidelastic force coefficients, which are characteristically different for single-phase and two-phase flows.

One aspect of the invention includes a system for detecting two-phase flow.

In one embodiment the system includes a data analysis system and an object in a crossflow.

In another embodiment the system includes a first sensor in a first direction parallel to the crossflow, connected to the object and to the data analysis system.

In another embodiment the system includes a second sensor in a second direction, connected to the object and to the data analysis system wherein the second direction is perpendicular to the first direction.

In another embodiment the system includes a data analysis system that collects information from the sensors, computes values representing fluidelastic-induced forces on the object, compares the values to reference values, and determines whether the flow is a two-phase flow.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The characteristics and advantages of an exemplary embodiment are set out in more detail in the following description, made with reference to the accompanying drawings.

DETAILED DESCRIPTION OF THE PREFERRED EMBODIMENTS

It is an object and feature of an exemplary embodiment described herein to provide a sensor system which correlates vibration-induced fluidelastic forces to fluid density and damping. It is another object and feature of an exemplary embodiment to provide a sensor system which is simple and low cost, which uses only simple force measurements and basic signal processing. An exemplary embodiment does not use flow velocity measurements.

One advantage of an exemplary embodiment described herein is the ability to provide a continuous prediction of two-phase flow in specific pipeline segments. Another advantage of an exemplary embodiment described herein is the ability to calibrate the sensor system so as to differentiate between, and identify, various two-phase flow regimes.

These and other objects, advantages, and features of the exemplary shale drill pipe described herein will be apparent to one skilled in the art from a consideration of this specification, including the attached drawings.

The characteristics of the cross-flow-induced vibrations are quite different for single-phase and two-phase flows due to changes in fluid-structure interactions.

For example, Karman vortex shedding, which is the dominant source of flow-induced vibrations in single-phase flow, has not been clearly detected in most two-phase flow regimes.

In addition, the turbulent buffeting flow-induced vibrations are more dominant in the two-phase flow.

Furthermore, the accumulation of air bubbles in the wake of the body in a cross-flow leads to increased damping. Accordingly, the damping in two-phase flow is much greater than that in single-phase flow.

The fluidelastic force, which is a function of the mass per unit length of the object, e.g. tube, in a cross-flow accounts for the inertia effect of the surrounding fluid. Therefore, the fluidelastic force reflects changes in density and damping and differentiates between single-phase and two-phase flow.

In general, the fluidelastic force F acting on a cylinder due to cross-flow is given by $$F = \frac{1}{2}\rho[D^2 C_m \ddot{q} + DV C_d \dot{q} + V^2 C_k q] \quad (1)$$

where $\rho$: density of fluid (kg/m$^3$)
D: tube outer diameter (m)
V: flow velocity (m/s)
q: tube flexural deflection (m)
$C_m$: the added mass coefficient
$C_d$: the added damping coefficient
$C_k$: the added stiffness coefficient The fluidelastic force coefficients $C_m$, $C_d$ and $C_k$ which can be measured will be different for single phase flow and for two-phase flow, due to the differences in the flow-induced vibrations outlined above. Accordingly, the fluidelastic force F will also be different between a single phase flow and a two-phase flow.

Figure 1:
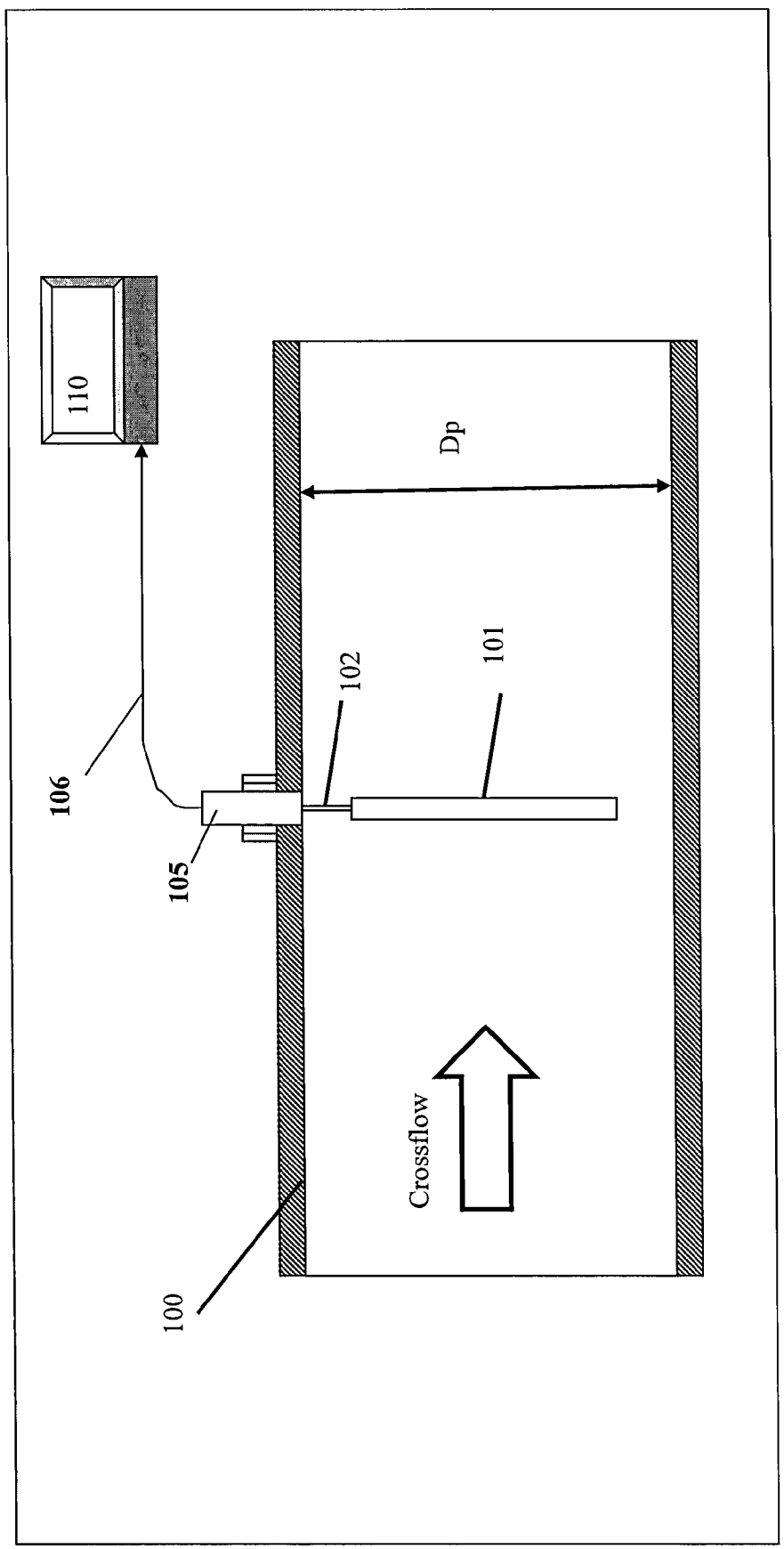
FIG. 1 depicts a schematic view of an exemplary embodiment mounted to a piping system.

In an exemplary embodiment of the sensor system, as shown in FIG. 1, the system includes a cantilever tube 101, which is subjected to crossflow when it is submerged in the fluid transmission pipe or channel 100. The cantilever tube is elastically supported by a thin and flexible rod 102, which has two flattened segments (shims) 103a and 103b. Two strain gages 104a and 104b are mounted on the two shims, respectively. The thin flexible rod 102 is fastened to the pipe wall via a sealed threaded end element 105. Strain gauge wirings 106 pass through the threaded end element 105 and connect to the data acquisition system 110 outside of the pipe 100.

In an exemplary embodiment, the cantilever tube has a length which is between 60-70% of the inner diameter of the fluid transmission pipe $D_p$, and an outer diameter which is substantially 5% of the pipe diameter $D_p$. In an exemplary embodiment, the diameter of the slender supporting rod is selected as a function of the channel diameter, the cantilever tube diameter and the range of flow rates. In an exemplary embodiment, the dimensions of the supporting rod are determined to provide appropriate bending flexibility in response to the anticipated cross-flow excitations. In an exemplary embodiment, the thin rod 102 has a length which is between 20 and 25% of the pipe diameter $D_p$, and a diameter between 1 and 2 mm. In an exemplary embodiment, the width of the shims is selected as a function of the channel diameter, the cantilever tube diameter and the range of flow rates. In an exemplary embodiment, the shims have a thickness which is between 0.3 and 0.5 mm, and the shims have dimensions selected to adequately accommodate the strain gage. In an exemplary embodiment, shims with dimensions of 4 mm by 8 mm accommodate a wide range of precision strain gages.

Figure 2:
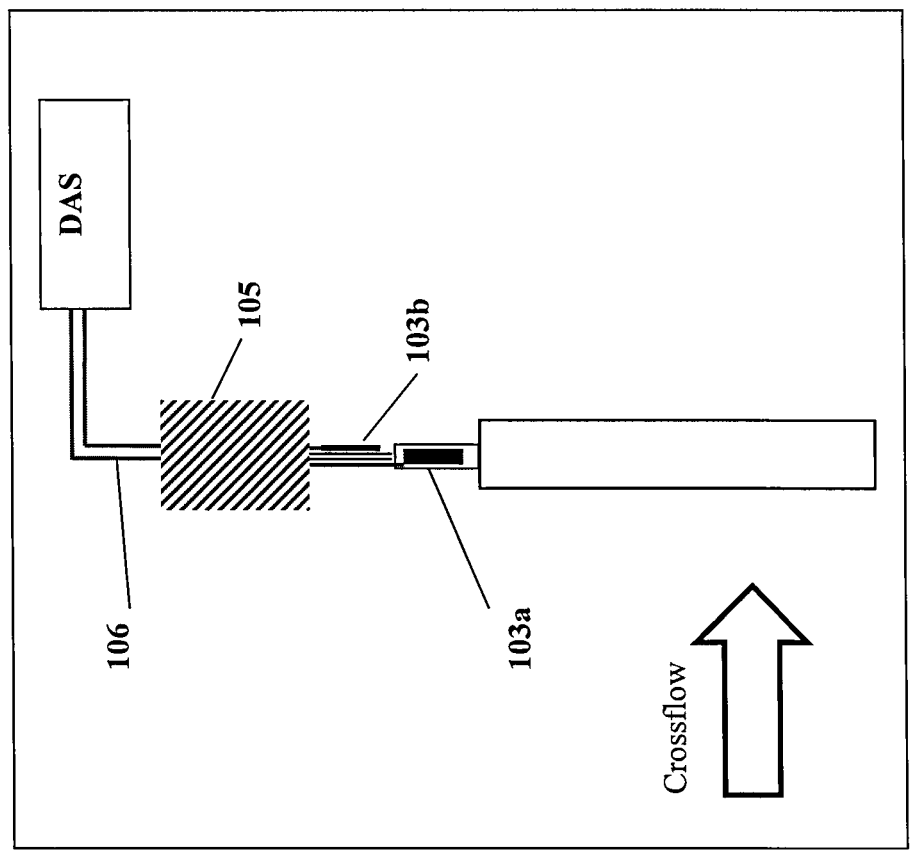
FIG. 2 depicts a schematic view of an exemplary embodiment.
Figure 3:
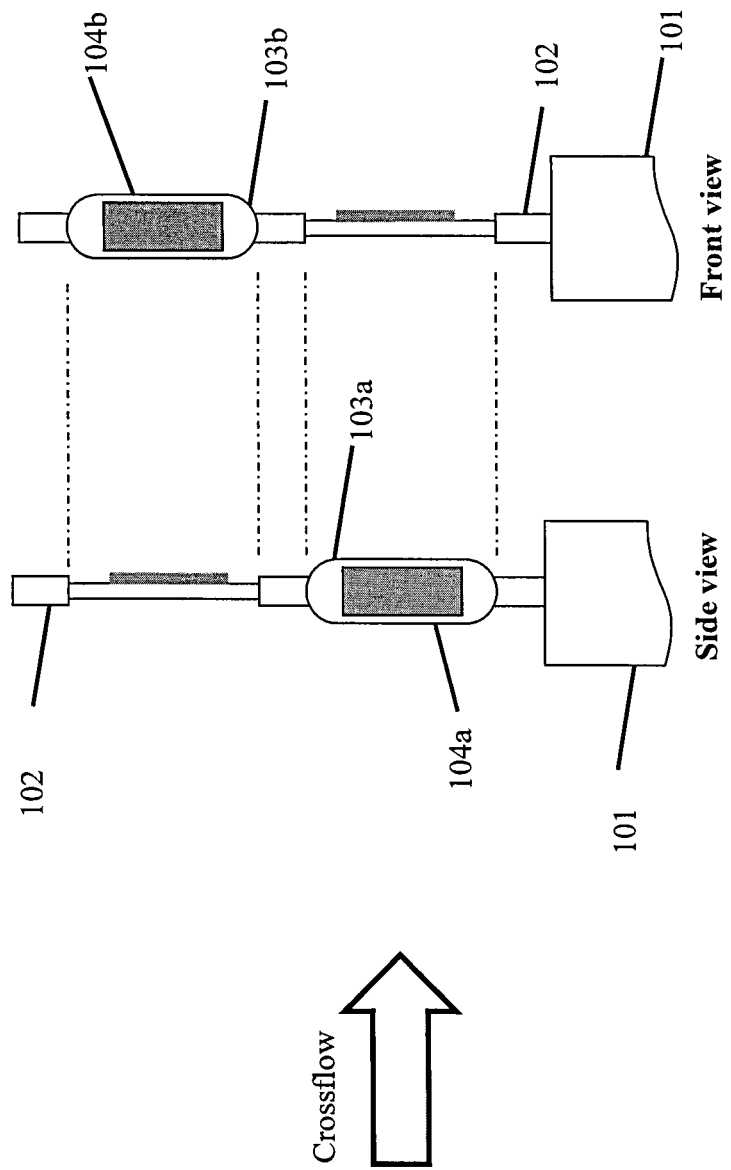
FIG. 3 depicts a schematic view of an instrumented flexible end of an exemplary embodiment.

In an exemplary embodiment, as shown in FIGS. 2 and 3, the thin rod 102 includes two flattened segments 103a, 103b, also known as shims, for mounting strain gages 104a, 104b. In an exemplary embodiment, each strain gauge is bonded to a shim. In an exemplary embodiment, the strain gages are protected by a waterproof coating to avoid corrosion.

The first and second flattened segments are perpendicular to each other, such that a first shim 103a is in the crossflow direction, and the second shim 103b is perpendicular to the crossflow direction. The strain gauges are used to measure flow information in a direction parallel to and perpendicular to the crossflow, as shown in FIG. 3. A first strain gauge 104a is placed along the crossflow direction and measures data in a direction normal to crossflow, and a second strain gauge 104b is placed at 90-degree to the crossflow direction, and measures data in the direction of the crossflow.

In an exemplary embodiment, the sensor system is calibrated prior to recording flow measurements. The sensitivity of the strain gauges is determined, for example in mV/N, by using a set of appropriate static forces to calibrate the gauges.

The fluidelastic force of Equation (1) noted above can be written with x and y components, where x is the direction of the cross-flow, and y is the direction perpendicular to the cross-flow, as:

$$F_x = \frac{1}{2}\rho V^2 [C_{xx} q_x + C_{xy} q_y] \quad (2)$$

$$F_y = \frac{1}{2}\rho V^2 [C_{yx} q_x + C_{yy} q_y] \quad (3)$$

Cross-flow induced vibrations of the cantilever tube 101 may be expressed in the following harmonic form $q = q_o \cos(\omega t)$, where $\omega$ is the tube frequency. Using this harmonic form, both equations (2) and (3) can be written in terms of amplitude and phase difference, as follows:

$$F_x = -(F_o)_x \cos(\omega t + \phi_x) \quad (4)$$

$$F_y = -(F_o)_y \cos(\omega t + \phi_y) \quad (5)$$

In an exemplary embodiment, the strain gauges 104a, 104b measure both amplitudes $(F_o)_x$, $(F_o)_y$ and phase differences $(\phi_x, \phi_y)$ of the fluidelastic forces for each crossflow velocity over a range of crossflow velocities. The data acquisition system 110 acquires the strain gages output, performs signal conditioning and filtering, and processes the required amplitude and phase measurements. A simple computational routine determines the force coefficients $(C_{xx}, C_{xy})$ and $(C_{yx}, C_{yy})$, by manipulating equations (2, 4) and (3, 5), respectively. The predicted coefficients $C_{xx}$, $C_{xy}$, $C_{yx}$, and $C_{yy}$ represent the combined effects of the fluid-induced mass, damping and stiffness, which are different for both the single and two-phase flows. Accordingly, these coefficients are plotted over a range of flow rates and form calibration or baseline curves.

In an exemplary embodiment, a baseline data curve is obtained by recording the estimated fluidelastic coefficients for a single-phase flow over a predetermined range of flow rates. Another set of calibration curves is obtained by recording the estimated fluidelastic coefficients for a two-phase flow, over the same predetermined range of mixing ratios and flow rates.

In an exemplary embodiment, once the above-noted calibration steps have been performed, sensor measurements can be recorded for a flow rate of interest, and the results judged against the calibration data to determine the nature of the flow at a particular region in the pipe 101.

Because many possible embodiments may be made of the invention without departing from the scope thereof, it is to be understood that all matter herein set forth or shown in the accompanying drawings is to be interpreted as illustrative and not in a limiting sense.

The invention claimed is:

1. A system for detecting two-phase flow comprising:
   a data analysis system;
   a pipe with crossflow inside the pipe;
   a thin rod with a first flat segment and a second flat segment
   a cantilever tube elastically supported by the thin rod;
   a first sensor on the first flat segment, in a first direction parallel to the crossflow, connected to the cantilever tube and to the data analysis system;
   a second sensor on the second flat segment, in a second direction perpendicular to the first direction, connected to the cantilever tube and to the data analysis system;
   wherein the cantilever tube is immersed in the crossflow, and
   wherein the data analysis system collects information from the sensors, computes values representing fluidelastic-induced forces on the cantilever tube, compares the values to reference values, and determines whether the crossflow is a two-phase flow.

2. A system as in claim 1, wherein the thin rod is flexible.

3. A system as in claim 1, wherein the thin rod is connected to the data analysis system by a sealed threaded end element.

4. A system as in claim 1, wherein the sensors are protected by a waterproof coating.

5. A method for detecting two-phase flow comprising the steps of:
   calibrating a sensor system, including
   obtaining a first baseline of fluidelastic force coefficients resulting from a fluid-structure interaction in a crossflow, by measuring first flow data with the sensor system for a single-phase flow over a predetermined range of flow rates, and computing the first baseline from the measured first flow data, and
   measuring second flow data at a fixed flow rate with the sensor system;
   using a data acquisition system to compute second fluidelastic force coefficients from the measured second flow data;
   comparing the second fluidelastic force coefficients with the first baseline to determine if the flow is a single phase flow or a two-phase flow.

6. A method for detecting two-phase flow as claimed in claim 5, further comprising the steps of:
   obtaining a third baseline of fluidelastic force coefficients resulting from a fluid-structure interaction in a crossflow, by measuring third flow data with the sensor system for a two-phase flow over a predetermined range of flow rates, and
   computing a second baseline from the third measured flow data, and
   comparing the second fluidelastic force coefficients with the second baseline to determine a two-phase flow regime of the second flow data.

* * * * *